United States Patent
Fujikawa

(10) Patent No.: US 9,946,305 B2
(45) Date of Patent: Apr. 17, 2018

(54) ELECTRONIC DEVICE

(71) Applicant: FUJITSU LIMITED, Kawasaki-shi, Kanagawa (JP)

(72) Inventor: Hideyuki Fujikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/376,858

(22) Filed: Dec. 13, 2016

(65) Prior Publication Data

US 2017/0168526 A1    Jun. 15, 2017

(30) Foreign Application Priority Data

Dec. 15, 2015    (JP) .................................. 2015-244173

(51) Int. Cl.
*G06F 1/16*    (2006.01)

(52) U.S. Cl.
CPC .......... *G06F 1/1654* (2013.01); *G06F 1/1615* (2013.01); *G06F 1/1616* (2013.01); *G06F 1/1626* (2013.01); *G06F 1/1632* (2013.01); *G06F 1/1667* (2013.01); *G06F 1/1669* (2013.01)

(58) Field of Classification Search
CPC .... G06F 1/1654; G06F 1/1632; G06F 1/1615; G06F 1/1626; G06F 1/1669; G06F 1/1667; G06F 1/1616
See application file for complete search history.

(56) References Cited

U.S. PATENT DOCUMENTS

| | | | | |
|---|---|---|---|---|
| 4,660,912 | A | * | 4/1987 | Tomek ................. H01R 13/447 174/67 |
| 2011/0058332 | A1 | * | 3/2011 | Skillman ............... G06F 1/1626 361/679.58 |
| 2012/0298536 | A1 | * | 11/2012 | Rauta ................... H04B 1/3888 206/301 |
| 2013/0017696 | A1 | * | 1/2013 | Alvarez Rivera ... H01R 13/447 439/142 |
| 2014/0049911 | A1 | | 2/2014 | Corbin et al. |
| 2014/0055014 | A1 | * | 2/2014 | Pan .......................... H05K 5/02 312/223.2 |
| 2014/0075214 | A1 | * | 3/2014 | Spollen ................. G06F 1/1662 713/300 |
| 2014/0080334 | A1 | * | 3/2014 | Tetsuya .............. H01R 13/5213 439/136 |

(Continued)

FOREIGN PATENT DOCUMENTS

| | | |
|---|---|---|
| JP | 2006-262052 | 9/2006 |
| JP | 2014-508998 | 4/2014 |
| KR | 20100122261 A | * 11/2010 |

*Primary Examiner* — Dimary Lopez Cruz
*Assistant Examiner* — Abhishek Rathod
(74) *Attorney, Agent, or Firm* — Fujitsu Patent Center

(57) ABSTRACT

An electronic device includes: a sheath including a connection magnet to couple another device, wherein the connection magnet is installed in a region of the sheath where the another device is coupled; a movable part installed in the region of the sheath where the another device is coupled, wherein the movable part is foldable back to a side where the connection magnet is present; and a magnetism-blocking part installed on a region of the movable part that covers the connection magnet when the movable part is folded back to the connection magnet side.

2 Claims, 11 Drawing Sheets

(56) References Cited

U.S. PATENT DOCUMENTS

| | | | |
|---|---|---|---|
| 2014/0113467 A1* | 4/2014 | Senatori | G06F 1/1633 439/142 |
| 2015/0205330 A1* | 7/2015 | Zhang | G06F 1/1626 361/679.3 |
| 2016/0070313 A1* | 3/2016 | Wu | G06K 19/07732 361/679.32 |
| 2017/0187409 A1* | 6/2017 | Widiaman | H04B 1/3888 |

* cited by examiner

US 9,946,305 B2

ELECTRONIC DEVICE

CROSS-REFERENCE TO RELATED APPLICATION

This application is based upon and claims the benefit of priority of the prior Japanese Patent Application No. 2015-244173, filed on Dec. 15, 2015, the entire contents of which are incorporated herein by reference.

FIELD

The embodiments discussed herein are related to an electronic device.

BACKGROUND

Recently, a variety of portable electronic devices have been distributed. In addition, among the portable electronic devices, there is a portable electronic device that is combined with another device that is removably connectable with the portable electronic device using a magnet.

In a connection mechanism for removably connecting an electronic device using a magnet, the magnetism of the magnet may have an effect on the surroundings. For example, when an electronic device that includes a connection mechanism using a magnet is accommodated in a bag, the electronic device may have an effect on a recording medium using magnetism (e.g., a magnetic card or magnetic tape) and also accommodated in the bag. In the case of a connection mechanism for attaching a keyboard to a tablet type personal computer, the magnet used in the connection mechanism radiates significantly stronger magnetism than the magnetism that is used when recording information on a recording medium that uses magnetism (e.g., a magnetic card or a magnetic tape). Therefore, when the magnet used in the connection mechanism of the electronic device is brought close to the recording medium using magnetism, there is the possibility of losing the recorded information.

The followings are a reference documents.
[Document 1] Japanese Laid-Open Patent Publication No. 2006-262052 and
[Document 2] Japanese National Publication of International Patent Application No. 2014-508998.

SUMMARY

According to an aspect of the embodiments, an electronic device includes: a sheath including a connection magnet to couple another device, wherein the connection magnet is installed in a region of the sheath where the another device is coupled; a movable part installed in the region of the sheath where the another device is coupled, wherein the movable part is foldable back to a side where the connection magnet is present; and a magnetism-blocking part installed on a region of the movable part that covers the connection magnet when the movable part is folded back to the connection magnet side.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an exemplary embodiment will be described. The exemplary embodiment described below is merely given by way of example, and has no intention to limit the technical scope of the present disclosure to the following aspect.

Figure 1:
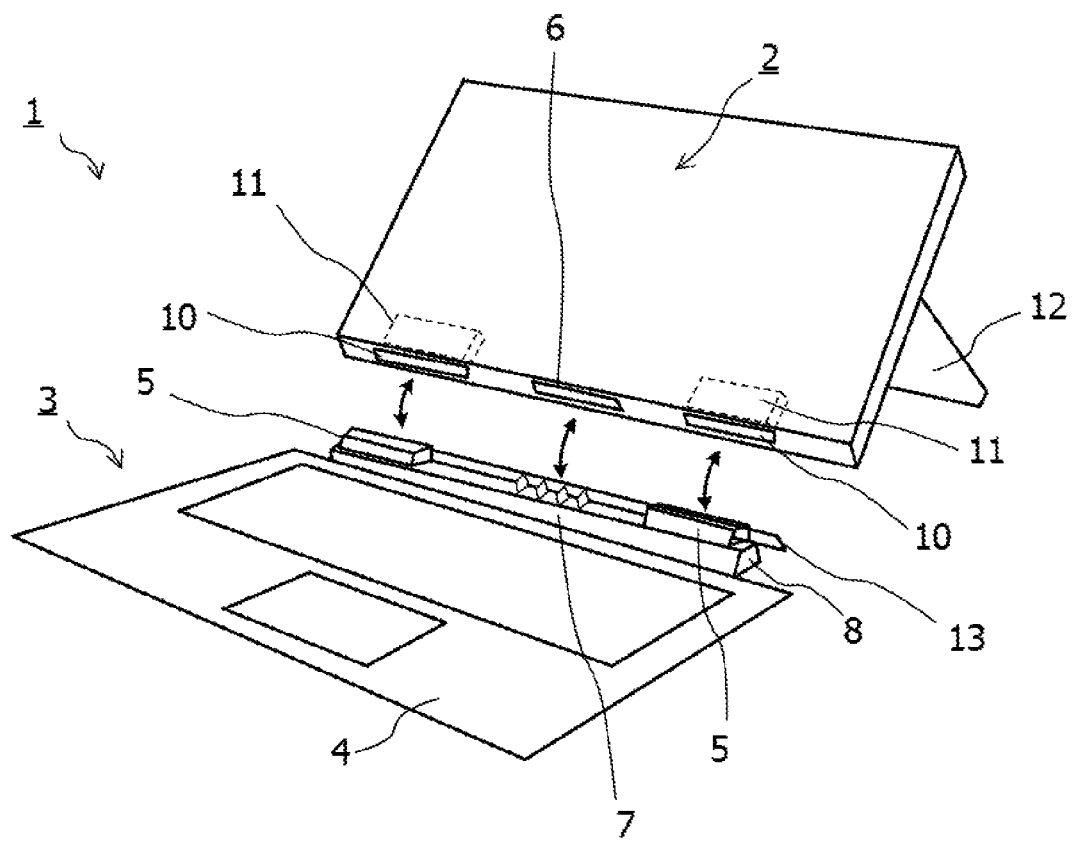
FIG. 1 is a view illustrating a personal computer according to an exemplary embodiment.

FIG. 1 is a view illustrating a personal computer (hereinafter, referred to as "PC") according to an exemplary embodiment. The PC 1 of the exemplary embodiment is provided with a tablet 2 (one example of "another device" mentioned herein), which is a computer device that includes, a central processing unit (CPU), a memory, a liquid crystal panel, and so on which are embedded therein, and a keyboard 3 for performing a character input to the tablet 2 via key manipulation. The keyboard 3 may be understood as an expansion device for expanding the function of the tablet 2 because the keyboard 3 supplements the input function of the tablet 2.

The keyboard 3 is an electronic device that includes a sheath 4 having a thin rectangular plate shape, and is provided with convex connection holders 5 each including a connection magnet embedded therein, in a region of the sheath 4 where the tablet 2 is connected. The connection holders 5 are installed at two positions on the sheath 4, with a terminal 7 being interposed therebetween to come into contact with an electrical contact 6 provided on the tablet 2. The two connection holders 5 and the terminal 7 are installed on a bar-shaped connection member 8, which extends along the longitudinal edge that forms the outer circumference of the sheath 4.

The tablet 2 is an electronic device having a thin rectangular plate shape, which has the same size as the keyboard 3. The tablet 2 includes concave fitted portions 10, into which the connection holders 5 are inserted, and the contact 6, which comes into contact with the terminal 7, on the longitudinal edge of the tablet 2 to which the keyboard 3 is connected. In addition, the tablet 2 includes fixing magnets 11 in the fitted portions 10, which are used by being adhered to the connection magnets in the connection holders 5. The fitted portions 10 each including a fixing magnet 11 embedded therein are formed at two positions on the tablet 2 in a manner in which the contact 6 is interposed therebetween. In addition, the tablet 2 is provided with a tilt stand 12 on the rear side thereof so as to maintain the tablet 2 in an obliquely standing state.

Figure 2:
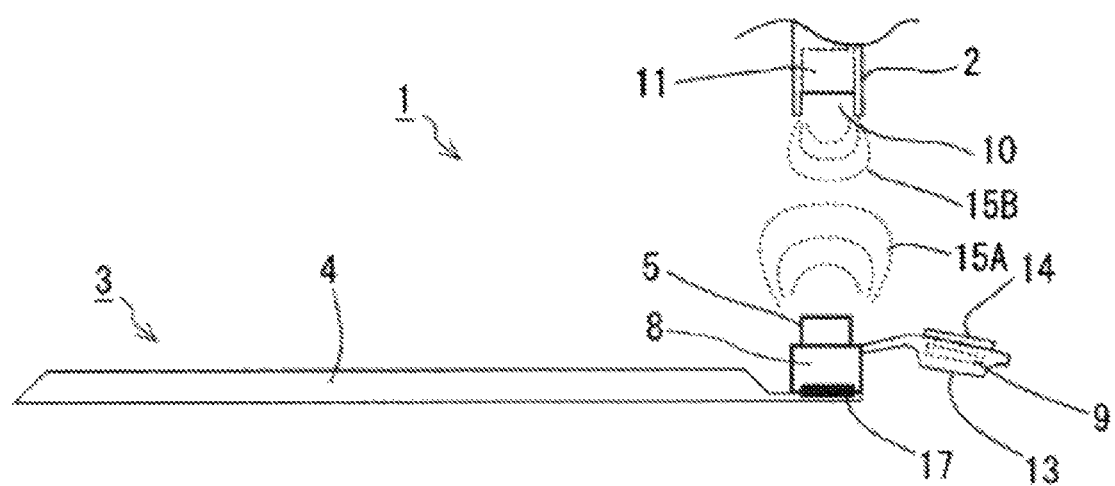
FIG. 2 is a view illustrating a structure of a connection portion between a tablet and a keyboard.

The keyboard 3 is provided with a movable part 13, which is installed to extend from the connection member 8 of the sheath 4 and is foldable back to the connection member 8 side. FIG. 2 is a view illustrating a structure of a connection portion of the tablet 2 and the keyboard 3. The movable part 13 is pivotally connected to the connection member 8 by a flexible material (e.g. synthetic leather) that forms the entire surface of the keyboard 3. Accordingly, the movable part 13 installed to extend from the connection member 8 is foldable back to the side where the connection holders 5 each including a connection magnet embedded therein are present. In addition, a magnetic body 9 (one example of the "magnetism-blocking part" mentioned herein) is installed in the movable part 13 at the region that covers the connection magnet in each connection holder 5 when the movable part 13 is folded back to the connection holder 5 side. The material forming the magnetic body 9 may be, for example, iron. When the magnetic body 9 is formed of iron, the magnetism of the connection magnets embedded in the connection holders 5 may be blocked.

In addition, the movable part 13 is provided with a frictional member 14 on the portion thereof that comes into contact with each connection holder 5. The material forming the frictional member 14 may be, for example, silicone, thermoplastic polyurethane (TPU), elastomer, nitrile-butadiene rubber (NBR), or ethylene propylene diene monomer (EPDM).

In addition, the connection magnet embedded in each connection holder 5, as illustrated in FIG. 2, radiates magnetism 15A in the direction in which the convex connection holder 5 protrudes. In addition, the fixing magnet 11 embedded in each concave fitted portion 10 radiates magnetism 15B in the direction in which the fitted portion 10 is opened. In addition, the magnetism 15A and the magnetism 15B have different polarities. Accordingly, the connection magnets embedded in the connection holders 5 and the fixing magnets 11 in the tablet 2 attract each other by the magnetic forces thereof.

Figure 3:
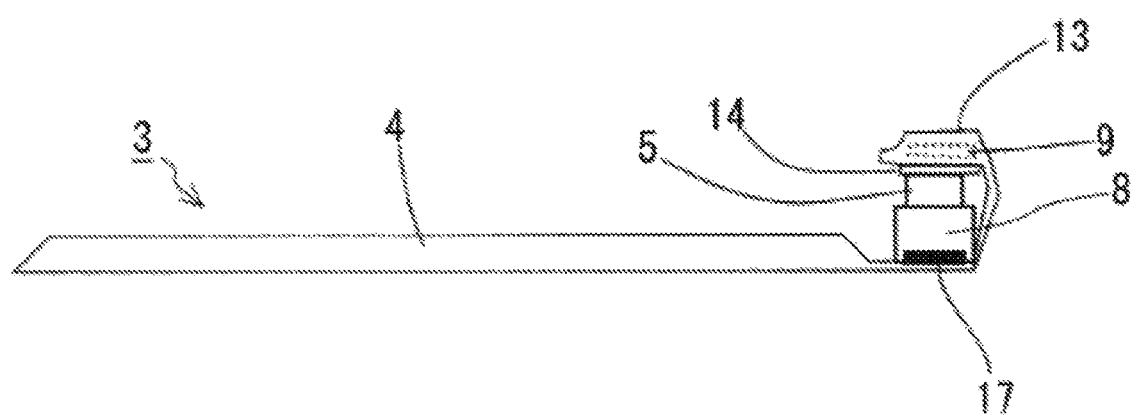
FIG. 3 is a view illustrating a state where a movable part is folded back to a connection holder side.

FIG. 3 is a view illustrating a state where the movable part 13 is folded back to the connection holder 5 side. When the movable part 13 is folded back to the connection holder 5 side, the connection magnet within each connection holder 5 is covered with the magnetic body 9 embedded in the movable part 13 on the side radiating the magnetism 15A. Accordingly, the magnetism 15A, which has been radiated from the connection magnet in the connection holder 5 in the direction in which the connection holder 5 protrudes, is blocked by the magnetic body 9.

In the keyboard 3 described above, the magnetism 15A, which has been radiated from the connection magnet in the connection holder 5 to the surroundings, may be blocked by the magnetic body 9 of the movable part 13 merely by folding the movable part 13 back to the connection holder 5 side. Accordingly, the keyboard 3 described above may suppress the surroundings from being affected by the magnetism of the connection magnet in the connection holder 5, which is used for connection with the tablet 2. Accordingly, for example, when the keyboard 3 is accommodated in a bag in a state where the movable part 13 is folded back to the connection holder 5 side, even if a recording medium that uses magnetism (e.g., a magnetic card or a magnetic tape) is accommodated in the bag, the possibility that the information recorded on the recording medium is lost due to the magnetism 15A radiated from the connection holder 5 is low. In addition, when the movable part 13 is folded back to the connection holder 5 side, the keyboard 3 is also put into a state where the movable part 13 covers the terminal 7. Accordingly, even in a state where the keyboard 3 is not connected to the tablet 2, the possibility that the terminal 7 comes into contact with an object around the keyboard 3 may be reduced.

In addition, because the fixing magnet 11 installed in the tablet 2 is present in the concave fitted portion 10, a recording medium (e.g., a magnetic card or a magnetic tape) accommodated in the bag does not come into contact with the fixing magnet 11 in the concave fitted portion 10 even if the tablet 2 is accommodated in the bag. Accordingly, the possibility that the information recorded on the recording medium is lost due to the magnetism 15B radiated from the fixing magnet 11 is low.

In addition, when the tablet 2 is connected to the keyboard 3, the movable part 13 may be put into, for example, a state as follows.

Figure 4:
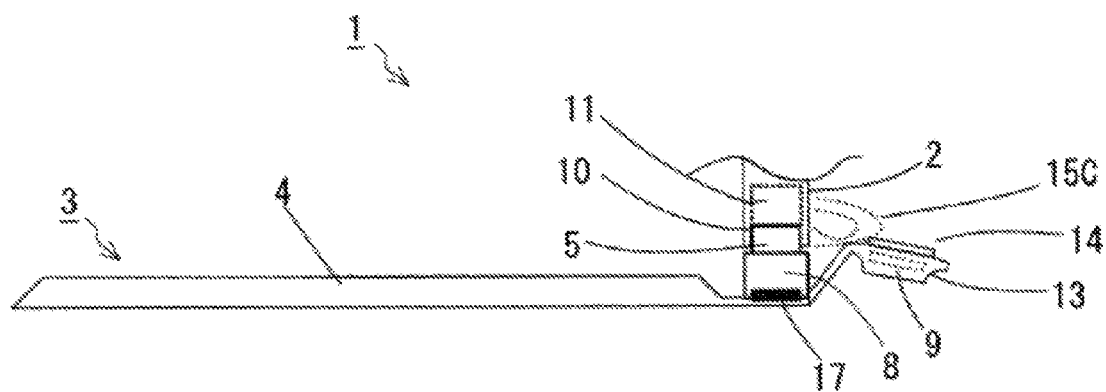
FIG. 4 is a view illustrating magnetism radiated from a fixing magnet of the tablet to the surroundings in a state where the tablet is connected to the keyboard.

FIG. 4 is a view illustrating the magnetism radiated from the fixing magnet 11 of the tablet 2 to the surroundings in a state where the tablet 2 is connected to the keyboard 3. For example, due to the relationship with the material forming the rear surface of the tablet 2, when the magnetism 15C of the fixing magnet 11 leaks from the rear surface of the tablet 2 even in a state where the tablet 2 is connected to the keyboard 3, the movable part 13 may be adhered to the rear surface of the tablet 2 by the magnetism 15C of the fixing magnet 11 leaking from the rear surface of the tablet 2.

Figure 5:
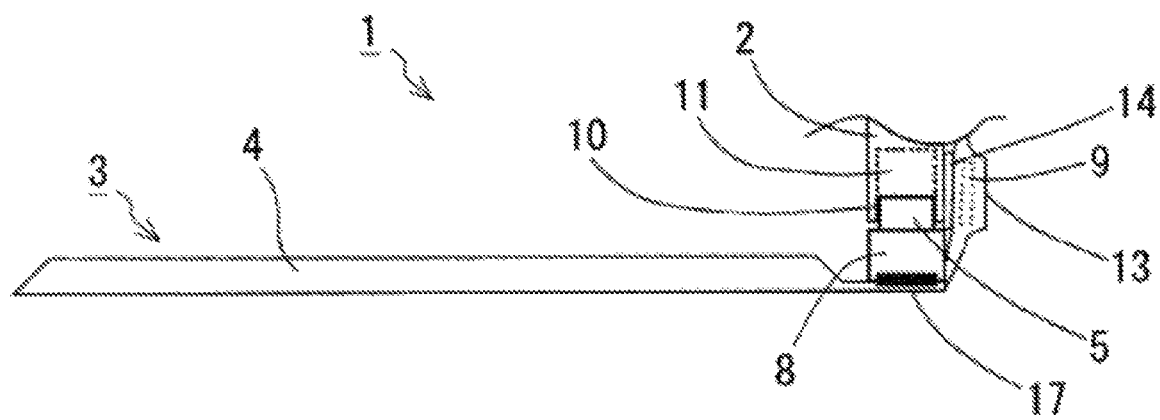
FIG. 5 is a view illustrating a state where the movable part is fixed to the rear surface of the tablet.

FIG. 5 is a view illustrating a state where the movable part 13 is fixed to the rear surface of the tablet 2. For example, even if the tablet 2 is connected to the keyboard 3, when the magnetism 15C of the fixing magnet 11 leaks from the rear surface of the tablet 2, the movable part 13 is folded back to the tablet 2 side, thereby being adhered by the magnetic force of the fixing magnet 11 and fixed to the rear surface of the tablet 2. In the case where the movable part 13 is capable of being fixed to the rear surface of the tablet 2 using the magnetism 15C of the fixing magnet 11 leaking from the rear surface of the tablet 2, the fixing magnet 11 corresponds to one example of the "second fixing magnet" mentioned herein. When the movable part 13 is fixed to the rear surface of the tablet 2 by the magnetic force of the fixing magnet 11, the movable part 13 may be suppressed from hanging down.

Figure 6:
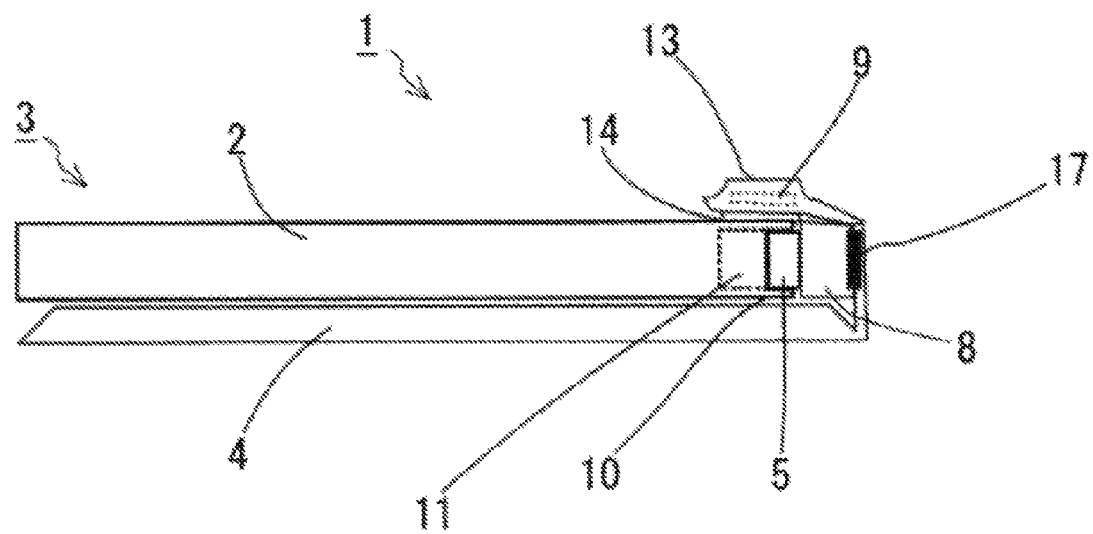
FIG. 6 is a view illustrating the personal computer in a closed state.

In addition, the PC 1 may be closed in a state where the movable part 13 is fixed to the rear surface of the tablet 2. FIG. 6 is a view illustrating the PC 1 in the closed state. The connection member 8 is pivotally connected to the main portion of the keyboard 3 by the flexible material forming the entire surface of the keyboard 3. Accordingly, when the tablet 2 connected to the keyboard 3 is closed, the connection member 8 is moved along with the tablet 2. Thereby, the movable part 13, installed to extend from the connection member 8 may follow the movement of the tablet 2 in the state where it is fixed to the rear surface of the tablet 2.

The keyboard 3 is provided, on the bottom portion of each connection holder 5, with a magnetic body 17 in order to suppress the magnetism of the connection magnet embedded in the connection holder 5 from leaking from a rear surface side of the keyboard 3. Accordingly, when the magnetic body 17 is a magnet that radiates some magnetic force, the movable part 13 may be put into, for example, a state as follows.

Figure 7:
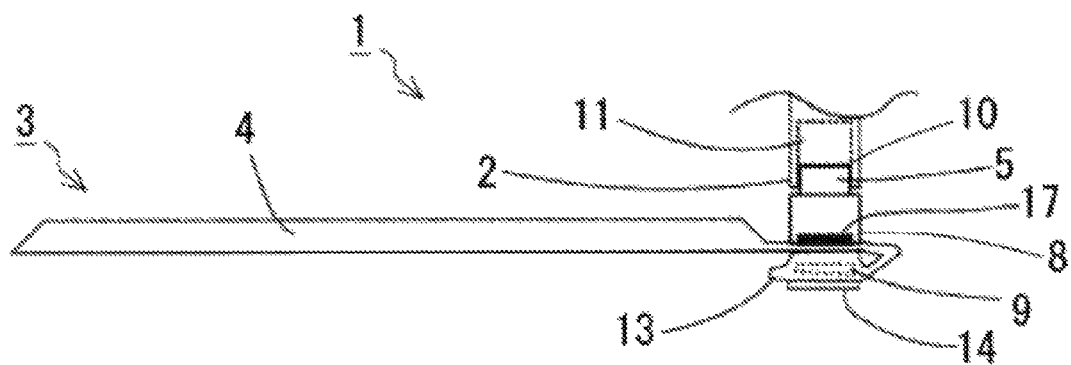
FIG. 7 is a view illustrating a state where the movable part is fixed to the rear surface of the keyboard.

FIG. 7 is a view illustrating a state where the movable part 13 is fixed to the rear surface of the keyboard 3. When the magnetic body 17 is a magnet that radiates some magnetic force and the magnetism of the magnetic body 17 leaks from the rear surface side of the keyboard 3, the movable part 13 is folded back to the rear surface side of the keyboard 3, thereby being adhered by the magnetic force of the magnetic body 17 and fixed to the rear surface of the keyboard 3. In the case where the movable part 13 is capable of being fixed to the rear surface of the keyboard 3 by the magnetism of the magnetic body 17 leaking from the rear surface of the keyboard 3, the magnetic body 17 corresponds to one example of the "first fixing magnet" mentioned herein. When the movable part 13 is fixed to the rear surface of the keyboard 3 by the magnetic force of the magnetic body 17, the movable part 13 may be suppressed from hanging down.

When the movable part 13 is fixed to the rear surface of the keyboard 3, the frictional member 14 is exposed from the rear surface side of the keyboard 3. Accordingly, when the keyboard 3 is placed on, for example, a table, the frictional member 14 comes into contact with the table. When the frictional member 14 comes into contact with the table, the keyboard 3 hardly slips on the table. When the keyboard 3 hardly slips on the table, a user who manipulates the PC 1 is not likely to feel troublesome due to the slippage of the PC 1 on the table.

Figure 8:
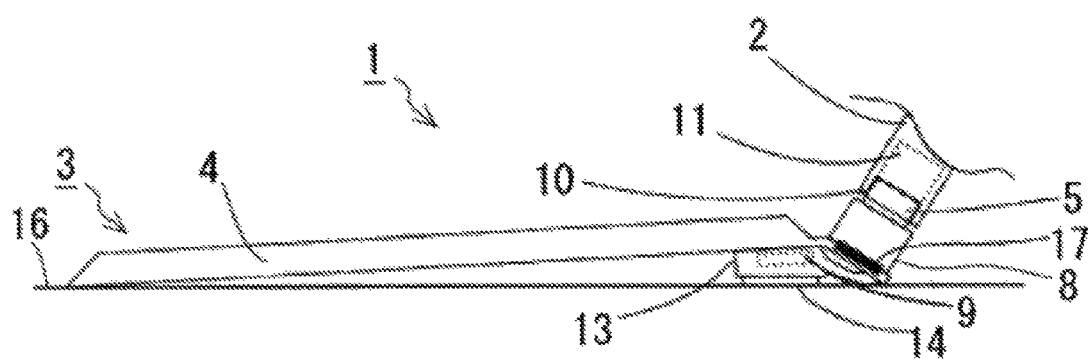
FIG. 8 is a view illustrating a state where a frictional member is in contact with a table.

In addition, the effect of suppressing the slippage of the keyboard 3 by the frictional member 14 is not exerted only when the movable part 13 is fixed to the rear surface of the keyboard 3 by the magnetism of the magnetic body 17 leaking from the rear surface of the keyboard 3. FIG. 8 is a view illustrating a state where the frictional material 14 is in contact with the table. For example, as illustrated in FIG. 8, when the movable part 13 folded back to the rear surface side of the keyboard 3 is brought closer to the center side of the keyboard 3 than the lower side of the connection member 8, and the movable part 13 serves as a tilt stand that tilts the keyboard 3, the movable part 13 is not fixed to the rear surface of the keyboard 3 by the magnetic force of the magnetic body 17. However, the movable part 13 remains folded back to the rear surface side of the keyboard 3 by being fitted between the keyboard 3 and a table 16. When the PC 1 is placed on the table 16 in the state where the movable part 13 is folded back to the rear surface side of the keyboard 3, the frictional member 14 comes into contact with the table 16. Accordingly, a state of making the PC 1 hardly slip on the table 16 is realized, which increases the stability of installation of the PC 1.

Figure 9:
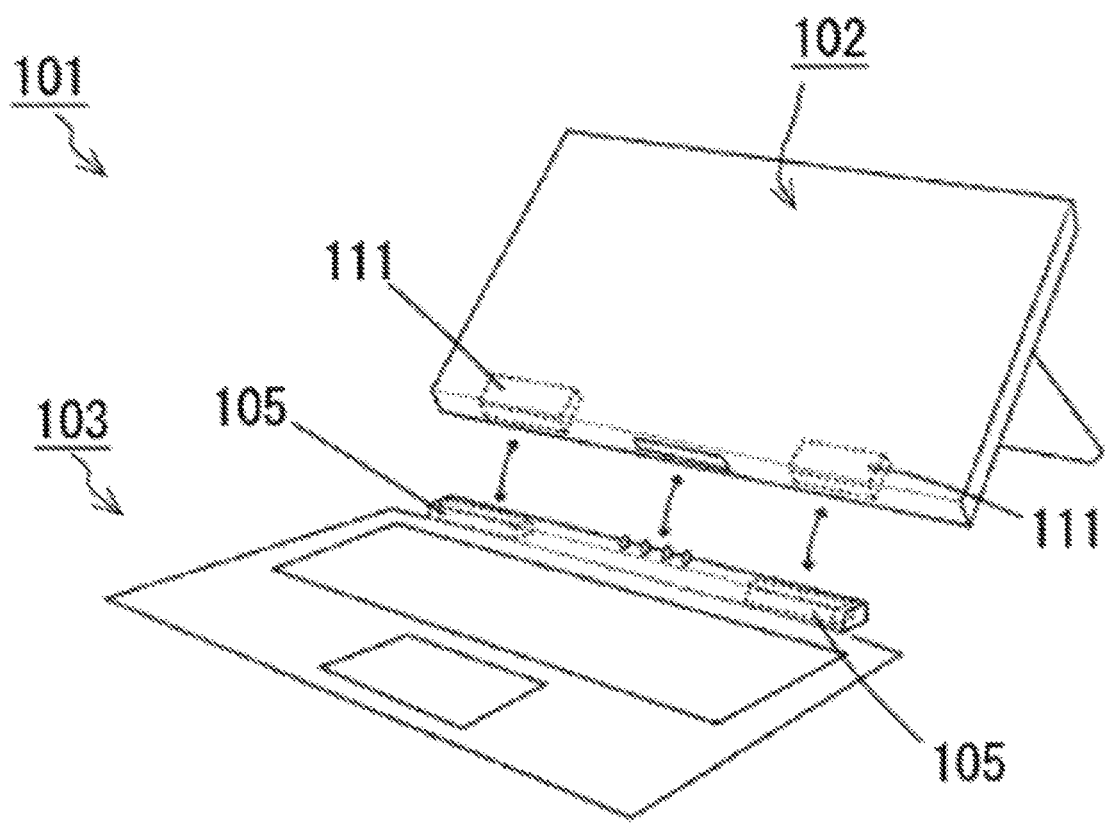
FIG. 9 is a view illustrating a personal computer of a comparative example.

FIG. 9 is a view illustrating a PC of a comparative example. The PC 101 of the comparative example includes a tablet 102 and a keyboard 103 like the PC 1 of the exemplary embodiment. However, the keyboard 103 of the comparative example is not provided with any element corresponding to the movable part 13, which is provided in the keyboard 3 of the exemplary embodiment. Accordingly, the magnetism of a connection magnet embedded in a connection holder 105 installed on the keyboard 103 or the magnetism of a fixing magnet 111 in the tablet 102 is not able to be suppressed from leaking to the surroundings.

Figure 10:
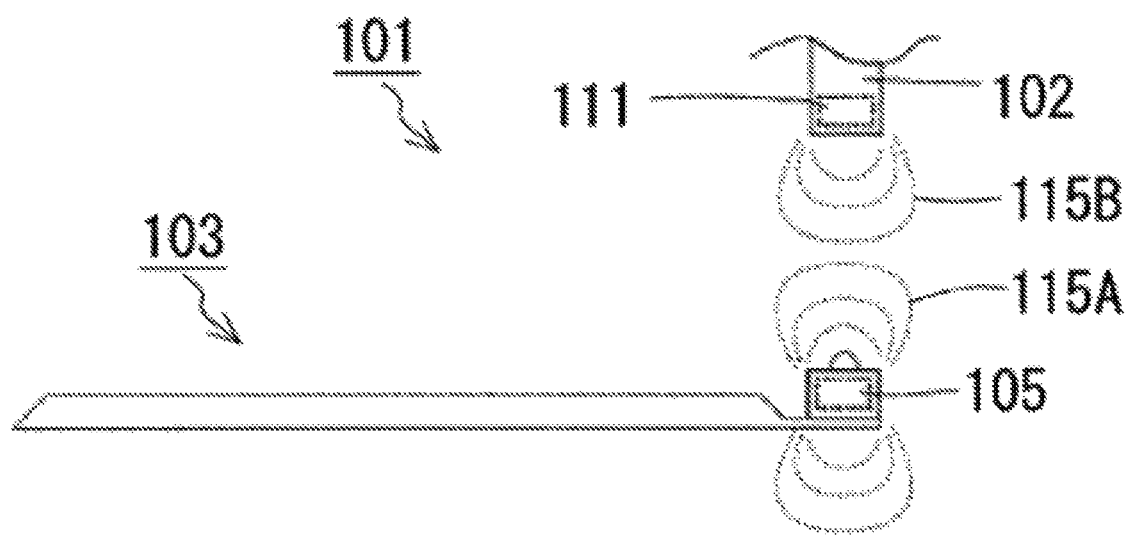
FIG. 10 is a view illustrating the leakage state of magnetism in a state where the tablet is not connected to the keyboard.

FIG. 10 is a view illustrating the leakage state of magnetism in the state where the tablet 102 is not connected to the keyboard 103. In the keyboard 103, which is not provided with any element corresponding to the movable part 13, which is provided in the keyboard 3 of the exemplary embodiment, the magnetism 115A radiated from the connection magnet embedded in the connection holder 105 is not able to be blocked. Therefore, when the keyboard 103 of the comparative example is accommodated in a bag and a recording medium that uses magnetism (e.g., a magnetic card or a magnetic tape) is accommodated in the bag, the possibility that the information recorded on the recording medium is lost due to the magnetism 115A radiated from the connection holder 105 is high. Meanwhile, with the keyboard 3 of the exemplary embodiment, because the magnetism 15A radiated from the connection magnet in the connection holder 5 to the surroundings may be blocked merely by folding the movable part 13 back to the connection holder 5 side, the possibility that the information on a recording medium that uses magnetism (e.g., a magnetic card or a magnetic tape) accommodated in the bag is lost is low even if the key board is accommodated in the back.

Figure 11:
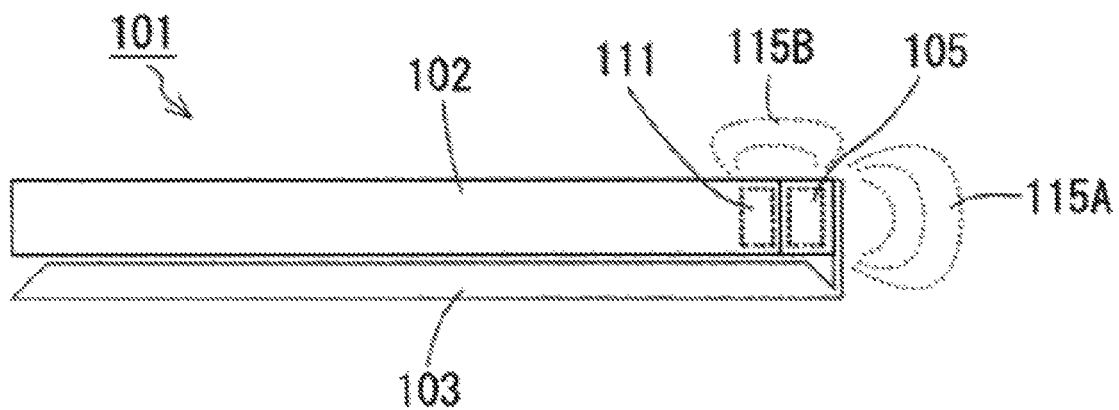
FIG. 11 is a view illustrating the leakage state of magnetism in a state where the tablet is connected to the keyboard.

In addition, in the case of the keyboard 103 of the comparative example, which is not provided with any element corresponding to the magnetic body 9 provided in the keyboard 3 of the exemplary embodiment, the information recorded on a recording medium (e.g., a magnetic card) accommodated in the bag is likely to be lost even if the PC 101 is accommodated in the bag in a state where the keyboard 103 is connected to the tablet 102. FIG. 11 is a view illustrating the leakage state of magnetism in the state where the tablet 102 is connected to the keyboard 103. When there is no element corresponding to the magnetic body 9 provided in the keyboard 3 of the exemplary embodiment, the magnetism 115A of the connection holder 105 or the magnetism 115B of the fixing magnet 111 easily leaks, for example, as illustrated in FIG. 11, even if the keyboard 103 is connected to the tablet 102. Therefore, even if the PC 101 is accommodated in a bag in a state where the keyboard 103 is connected to the tablet 102, the information recorded on a recording medium (e.g., a magnetic card) accommodated in the bag is likely to be lost. Meanwhile, in the PC 1 of the exemplary embodiment, the magnetism leaking from the connection holder 5 or the fixing magnet 11 to the surroundings is blocked by the magnetic body 9. Thus, even if the keyboard 103 of the comparative example, which has no element corresponding to the magnetic body 9, is connected to the tablet 102 and is accommodated in, for example, a bag, the possibility that the information recorded on a recording medium (e.g., a magnetic card) accommodated in the bag is lost is lower than that in the PC 101 of the comparative example.

In addition, although the movable part 13 is installed on the keyboard 3 in the exemplary embodiment, the movable part 13 may be installed on the tablet 2, rather than the keyboard 3. When the movable part 13 is installed on the tablet 2, the tablet 2 corresponds to one example of the "electronic device" mentioned therein, and the keyboard 3 corresponds to one example of the "another device" mentioned herein.

In addition, although the PC 1, in which the tablet 2 and the keyboard 3 are connected to each other, is illustrated in the exemplary embodiment, the exemplary embodiment may be modified in such a manner in which any one of various electronic devices, excluding the keyboard 3, is connected to the tablet 2 or any one of various electronic devices, excluding the tablet 2.

In addition, although the fixing magnet 11 is installed on the tablet 2 in the exemplary embodiment, any element that is held by magnetic force on the connection magnet embedded in the connection holder 5, may be installed on the tablet 2 instead of the fixing magnet 11. The element, which is held by magnetic force on the connection magnet in the connection holder 5, may be constituted of any one of various magnetic bodies (e.g., iron), rather than a permanent magnet (e.g., the fixing magnet 11). Even when a magnetic body (e.g., iron) is installed on the tablet 2 instead of the fixing magnet 11, the keyboard 3 may be connected to the tablet 2 using the connection magnet in the connection holder 5 as in the above-described exemplary embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device comprising:
   a sheath of a keyboard that includes a first connection portion;
   a first magnet installed in the first connection portion;
   a tablet device that includes a second connection portion to couple with the first connection portion;
   a second magnet installed in the second connection portion; and
   a movable part installed at a side of the first connection portion of the sheath and that includes a magnetic body,
   wherein when the tablet device is separated from the sheath of the keyboard, the movable part is foldable back to a side of the first connection portion and
   covers the first connection-portion, and
   the magnetic body that blocks a magnetism radiated from the first magnet to outside of the first connection portion.

2. The electronic device according to claim 1, wherein the movable part includes a frictional member in a region thereof that is exposed outward when the movable part is folded back to a side opposite to the first magnet.

* * * * *